(12) United States Patent
Hatada

(10) Patent No.: US 9,036,265 B2
(45) Date of Patent: May 19, 2015

(54) OPTICAL SYSTEM AND IMAGE PICKUP APPARATUS HAVING THE SAME

(71) Applicant: Canon Kabushiki Kaisha, Tokyo (JP)

(72) Inventor: Takahiro Hatada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 13/890,621

(22) Filed: May 9, 2013

(65) Prior Publication Data

US 2013/0308041 A1   Nov. 21, 2013

(30) Foreign Application Priority Data

May 17, 2012   (JP) ................. 2012-113521

(51) Int. Cl.
| | | |
|---|---|---|
| *G02B 15/10* | (2006.01) | |
| *G02B 15/12* | (2006.01) | |
| *G02B 15/14* | (2006.01) | |
| *G02B 27/64* | (2006.01) | |
| *H04N 5/225* | (2006.01) | |

(52) U.S. Cl.
CPC ............... *G02B 15/12* (2013.01); *G02B 15/10* (2013.01); *G02B 15/14* (2013.01); *G02B 27/646* (2013.01); *H04N 5/2254* (2013.01)

(58) Field of Classification Search
CPC ........ G02B 15/00; G02B 15/02; G02B 15/04; G02B 15/06; G02B 15/08; G02B 15/10; G02B 15/12
USPC .................................. 359/672–675
See application file for complete search history.

(56) References Cited

U.S. PATENT DOCUMENTS

| | | | |
|---|---|---|---|
| 5,966,246 A | 10/1999 | Yoshikawa | |
| 7,236,305 B2 * | 6/2007 | Yakita | ............... 359/675 |
| 2004/0223233 A1 | 11/2004 | Horiuchi | |
| 2010/0182705 A1 | 7/2010 | Hori et al. | |
| 2011/0228159 A1 | 9/2011 | Imaoka et al. | |

(Continued)

FOREIGN PATENT DOCUMENTS

| | | |
|---|---|---|
| CN | 1160225 A | 9/1997 |
| CN | 1942803 A | 4/2007 |

(Continued)

OTHER PUBLICATIONS

Extended European Search Report dated Nov. 13, 2013, issued in counterpart application No. 13167769.2.

(Continued)

*Primary Examiner* — Darryl J Collins
(74) *Attorney, Agent, or Firm* — Carter, DeLuca, Farrell & Schmidt, LLP

(57) ABSTRACT

An optical system (OL) includes a magnification conversion optical unit (EXT) configured to be insertable and removable at a position between an aperture stop (SP) and an image plane (IP) of the optical system in order to change a focal length of the optical system, a total lens length of the optical system is constant before and after insertion of the magnification conversion optical unit, and a length Lp on an optical axis from the aperture stop to the image plane of the optical system, and a length Le on the optical axis from a lens surface closest to an object side of the magnification conversion optical unit to the image plane when the magnification conversion optical unit is inserted are appropriately set.

12 Claims, 11 Drawing Sheets

(56) References Cited

U.S. PATENT DOCUMENTS

2012/0062993 A1  3/2012  Li
2012/0224269 A1* 9/2012  Sakamoto .................... 359/674

FOREIGN PATENT DOCUMENTS

| | | |
|---|---|---|
| EP | 1092999 A2 | 4/2001 |
| EP | 2083303 A1 | 7/2009 |
| JP | 02-100010 A | 4/1990 |
| JP | 04-324811 A | 11/1992 |
| JP | 2001-281546 A | 10/2001 |
| JP | 2009-003292 A | 1/2009 |
| JP | 2010-186179 A | 8/2010 |
| JP | 2011-112725 A | 6/2011 |

OTHER PUBLICATIONS

European Partial Search Report dated Aug. 6, 2013 issued in corresponding application No. 13167769.2.
Chinese Office Action dated Jan. 7, 2015 issued in corresponding application No. 201310176075.0.

* cited by examiner

OPTICAL SYSTEM AND IMAGE PICKUP APPARATUS HAVING THE SAME

BACKGROUND OF THE INVENTION

1. Field of the Invention

The present invention relates to an optical system and an image pickup apparatus including the optical system, which are suitable for an image pickup optical system that is used for an image pickup apparatus such as a video camera, a digital still camera, a silver-salt film camera, or a broadcasting television camera.

2. Description of the Related Art

In an image pickup apparatus such as a single-lens reflex camera, as a method of changing a focal length of an image pickup optical system, a converter method in which a magnification conversion optical unit (an extender) is inserted into an optical path so as to change the focal length of a total system is known. For example, in an interchangeable lens for the single-lens reflex camera, a rear converter is mounted between the interchangeable lens and a lens mount of the camera body to be able to design a focal length of the interchangeable lens to be long, i.e. to obtain a long focus.

In a compact camera or the like, a front converter is mounted on an object side relative to a lens unit closest to the object side of an image pickup optical system, and thus the focal length of the total system can be elongated. In addition, a rear converter is mounted on an image side of a main lens system and thus the focal length of the total system can be changed to be long (Japanese Patent Laid-Open No. 2011-112725).

On the other hand, as a method in which a total lens length (a length from a first lens surface to an image plane) does not change before and after insertion of the converter, a method of inserting and removing the built-in magnification conversion optical unit in a relay unit of a zoom lens is known. In the zoom lens for a television camera, an afocal unit is provided at a relatively front side in the relay unit of the zoom lens, and the magnification conversion optical unit (the extender, hereinafter referred to as an EXT) is inserted into and removed from this afocal unit.

A zoom lens disclosed in Japanese Patent Laid-Open No. 2010-186179 is, in order from an object side to an image side, configured by a first lens unit that does not move in zooming, a second lens unit that monotonically moves to an image plane side in zooming, a third lens unit that moves to correct a variation of the image plane caused by zooming, and a fourth lens unit that does not move in zooming. In this configuration, the extender is inserted and removed at a position where an air gap is the widest in the fourth lens unit so as to change a range of the focal length of the total system.

As a zoom lens that has an image stabilizing function to correct a blur of an image caused by a vibration of the zoom lens, a zoom lens that shifts a part of a lens unit constituting the zoom lens in a direction perpendicular to an optical axis so as to correct the blur of a shot image is known.

A zoom lens disclosed in Japanese Patent Laid-Open No. 2001-281546 is configured by a first lens unit that does not move in zooming, a second lens unit that is a zoom unit (a magnification varying unit), a third lens unit that corrects an image plane varying in accordance with zooming, and a fourth lens unit that does not move in zooming. Furthermore, a lens unit for image stabilization is contained at a position closest to the object side in the fourth lens unit.

The converter method in which the magnification conversion optical unit is built in apart of the optical system can change the range of the focal length of the total system to a telephoto side without changing the total lens length by inserting the magnification conversion optical unit. However, when the magnification conversion optical unit is inserted and removed, in order to maintain an optical performance appropriately, it is necessary to appropriately set a lens configuration of the magnification conversion optical unit and also to insert and remove the magnification conversion optical unit at an appropriate position in an optical path.

For example, if configurations of optical systems that are located ahead and behind the magnification conversion optical unit are inappropriate, the optical performance is significantly reduced when the magnification conversion optical unit is inserted. Furthermore, a size of the magnification conversion optical unit is increased, and therefore rapid insertion and removal are difficult.

SUMMARY OF THE INVENTION

The present invention provides an optical system and an image pickup apparatus including the optical system capable of easily changing a focal length of a total system so as to be long while maintaining an appropriate optical performance before and after a magnification conversion optical unit is inserted.

An optical system as one aspect of the present invention includes a magnification conversion optical unit configured to be insertable and removable at a position between an aperture stop and an image plane of the optical system in order to change a focal length of the optical system, a total lens length of the optical system is constant before and after insertion of the magnification conversion optical unit, and a length Lp on an optical axis from the aperture stop to the image plane of the optical system and a length Le on the optical axis from a lens surface closest to an object side of the magnification conversion optical unit to the image plane when the magnification conversion optical unit is inserted are appropriately set.

An image pickup apparatus as another aspect of the present invention includes the optical system, and a solid-state image pickup element configured to receive light of an image formed by the optical system.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings. An optical system of the present invention is a zoom lens or a fixed focal length lens. The optical system of the present invention includes a magnification conversion optical unit that is insertable and removable at a position between an aperture stop and an image plane of the optical system while maintaining a total lens length to be constant in order to change a focal length of the optical system.

Figure 1:
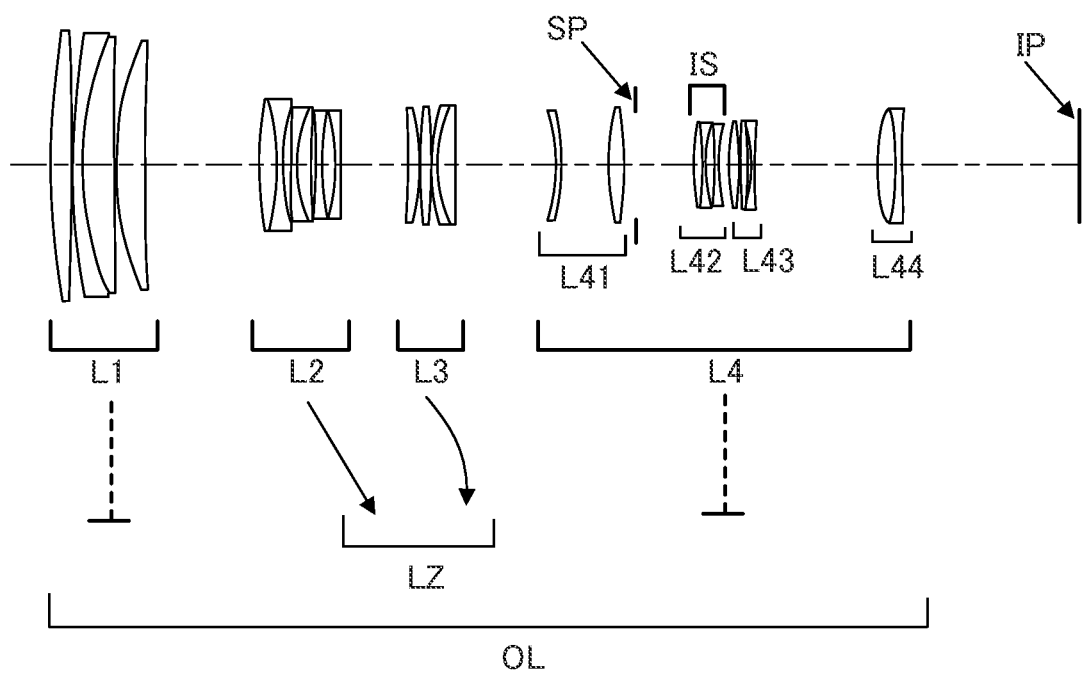
FIG. 1 is a cross-sectional diagram of lenses (an optical system) in a state where a magnification conversion optical unit is not inserted in Embodiment 1 of the present invention.
Figure 2A:
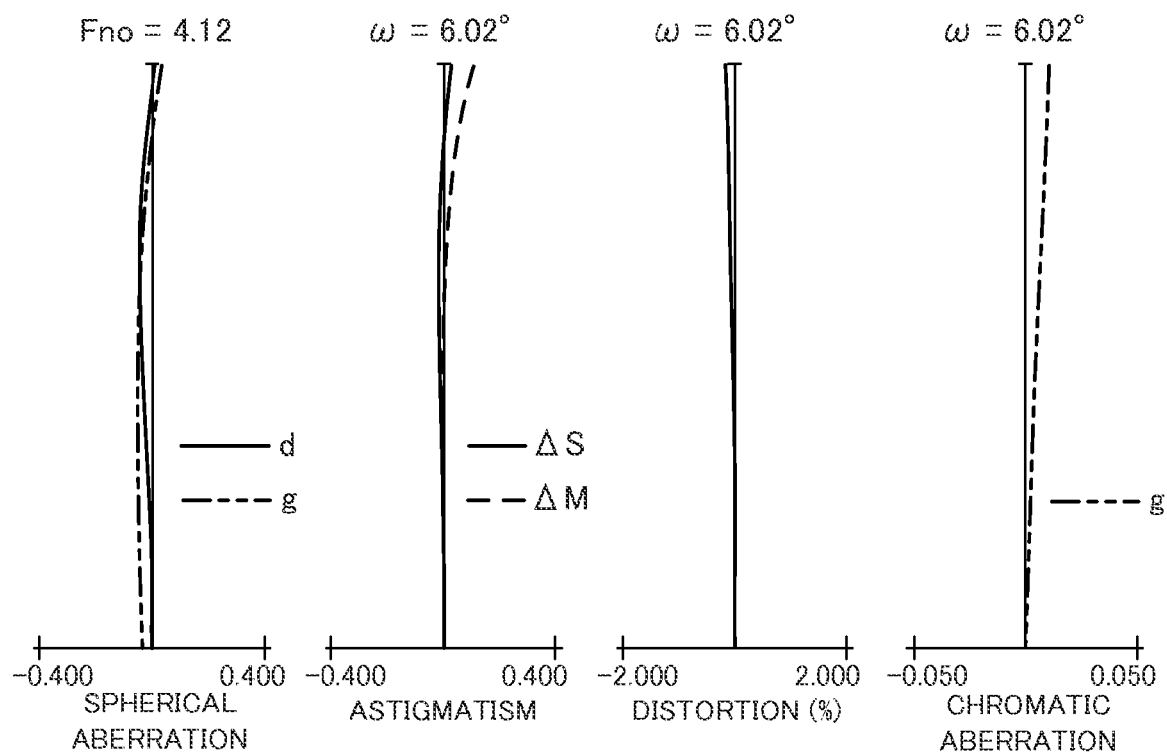
FIGS. 2A and 2B are vertical aberration diagrams of the lenses at a wide angle end and a telephoto end, respectively, in the state where the magnification conversion optical unit is not inserted in Embodiment 1 of the present invention.
Figure 2B:
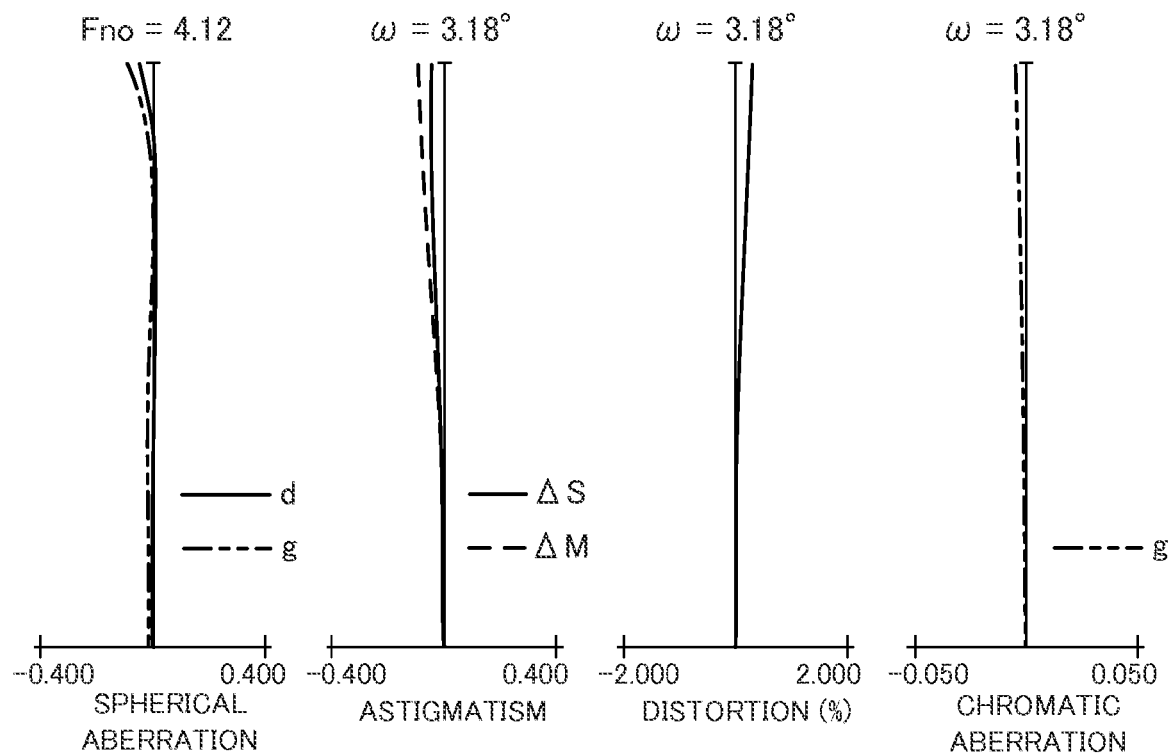
Figure 3:
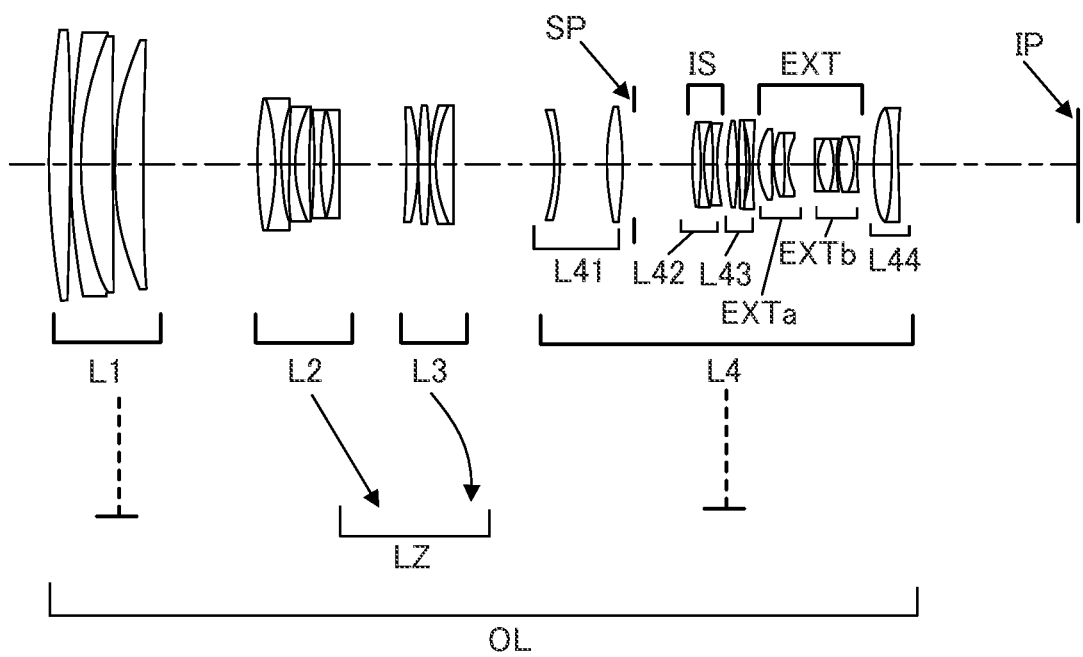
FIG. 3 is a cross-sectional diagram of the lenses in a state where the magnification conversion optical unit is inserted in Embodiment 1 of the present invention.
Figure 4A:
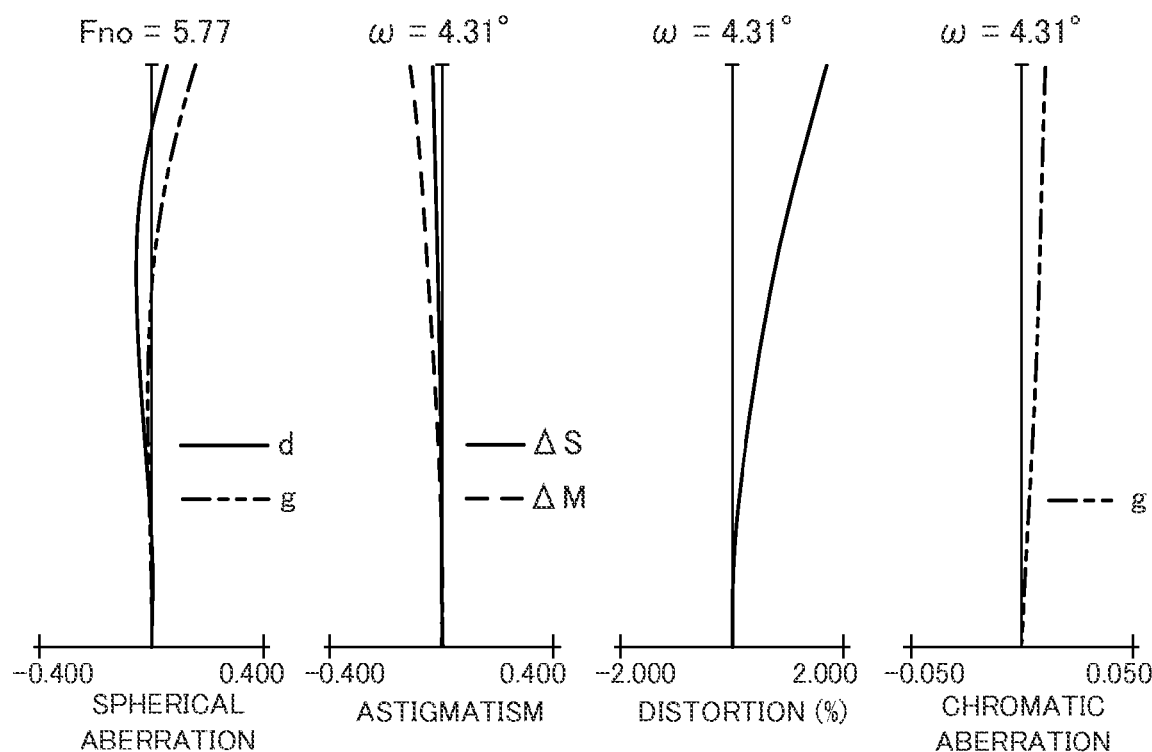
FIGS. 4A and 4B are vertical aberration diagrams of the lenses at the wide angle end and the telephoto end, respectively, in the state where the magnification conversion optical unit is inserted in Embodiment 1 of the present invention.
Figure 4B:
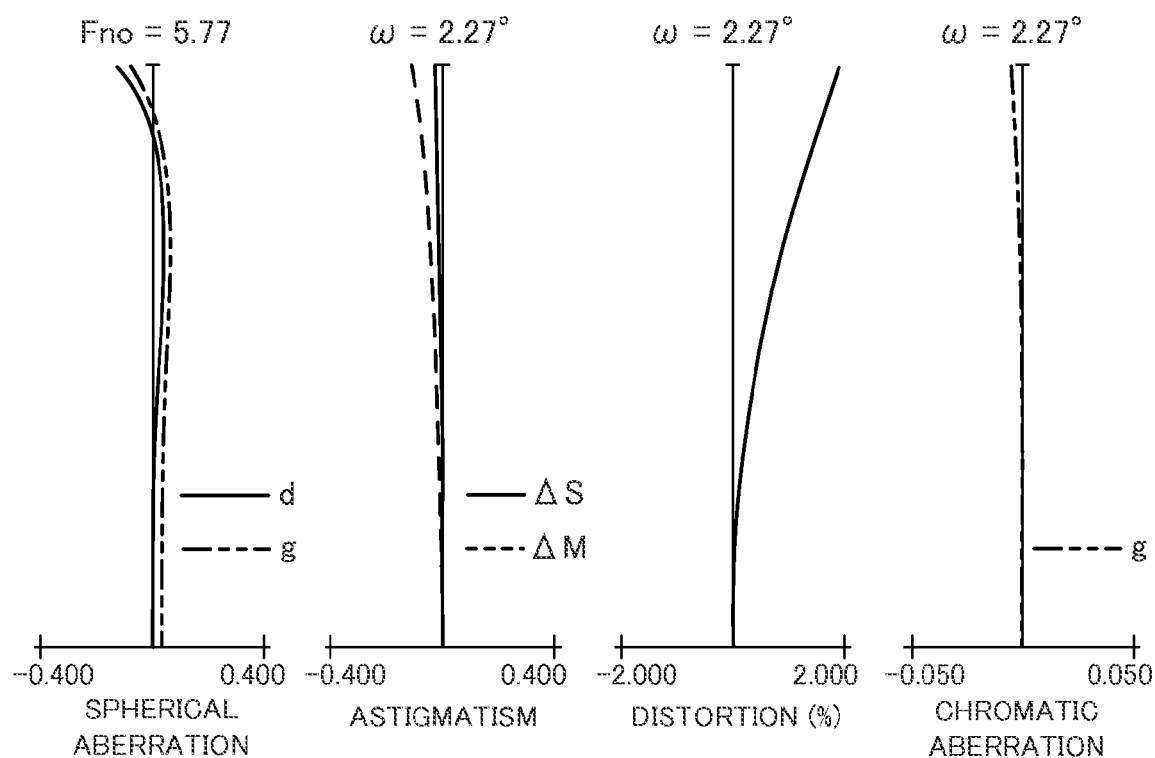

FIG. 1 is a cross-sectional diagram of lenses (an optical system) at a wide angle end (a short focal length end) when the magnification conversion optical unit is not inserted in an optical path in Embodiment 1 of the present invention. FIGS. 2A and 2B are vertical aberration diagrams at the wide angle end and a telephoto end (a long focal length end), respectively, when the magnification conversion optical unit is not inserted in the optical path in Embodiment 1 of the present invention. FIG. 3 is a cross-sectional diagram of the lenses at the wide angle end when the magnification conversion optical unit is inserted in the optical path in Embodiment 1 of the present invention. FIGS. 4A and 4B are vertical aberration diagrams at the wide angle end and the telephoto end, respectively, when the magnification conversion optical unit is inserted in the optical path in Embodiment 1 of the present invention.

Figure 5A:
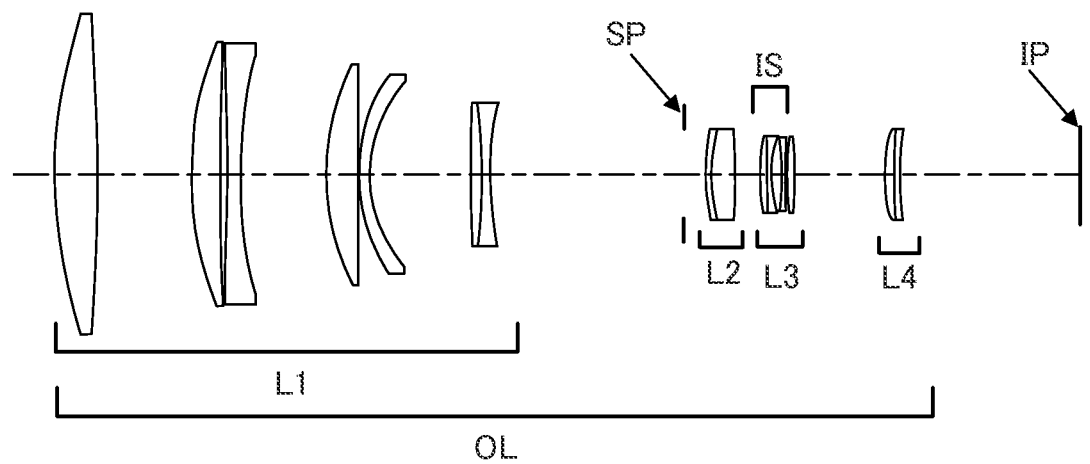
FIGS. 5A and 5B are a cross-sectional diagram and a vertical aberration diagram of lenses, respectively, in a state where a magnification conversion optical unit is not inserted in Embodiment 2 of the present invention.
Figure 5B:
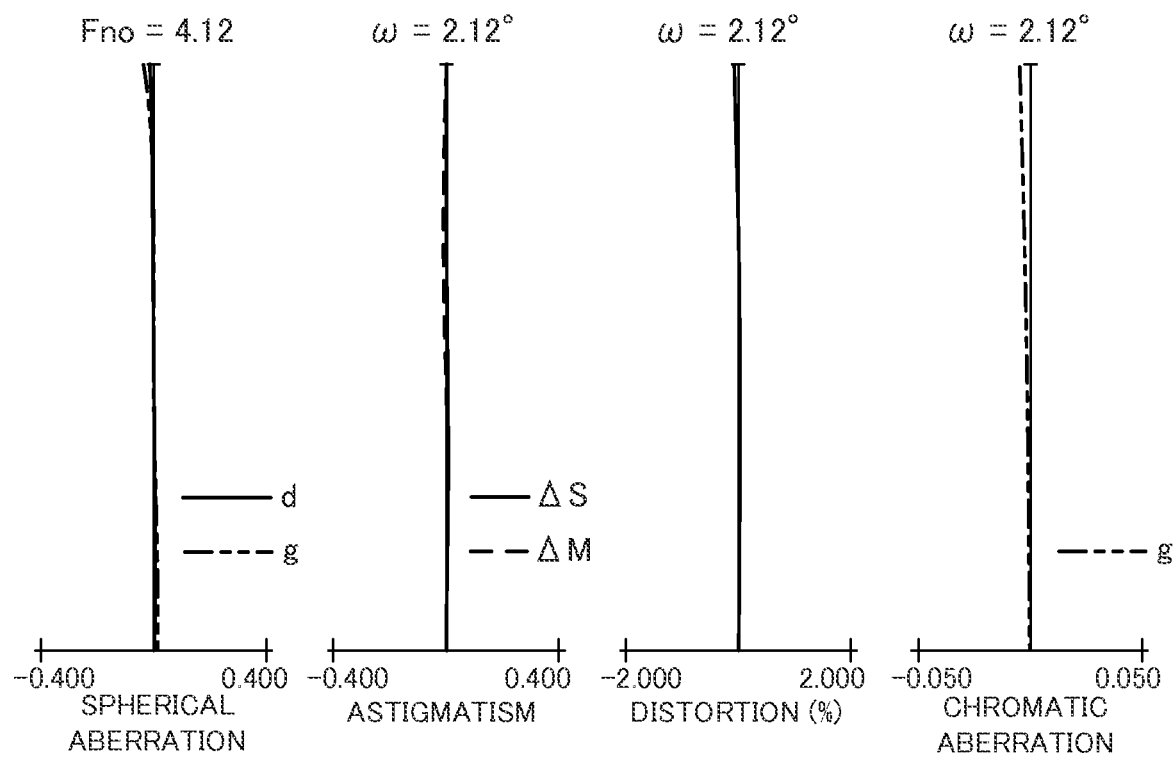
Figure 6A:
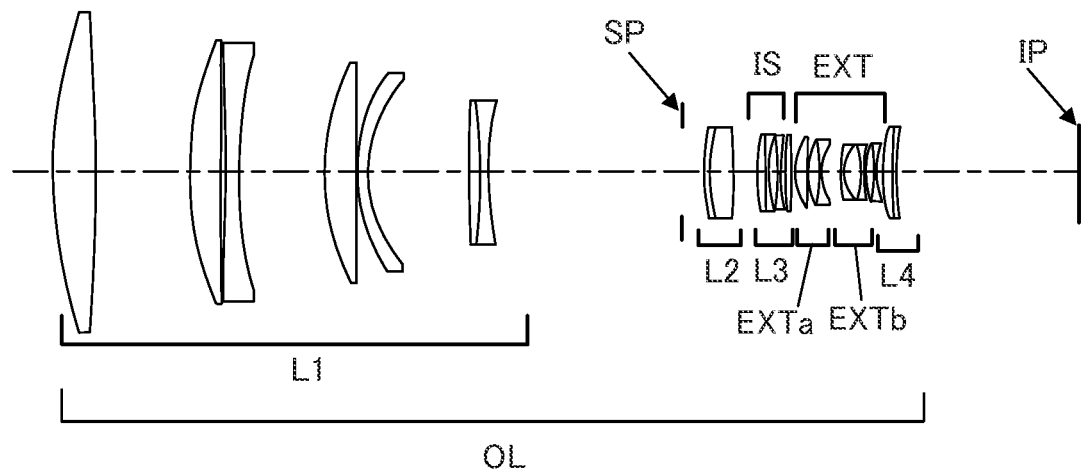
FIGS. 6A and 6B are the cross-sectional diagram and the vertical aberration diagram of the lenses, respectively, in the state where the magnification conversion optical unit is inserted in Embodiment 2 of the present invention.
Figure 6B:
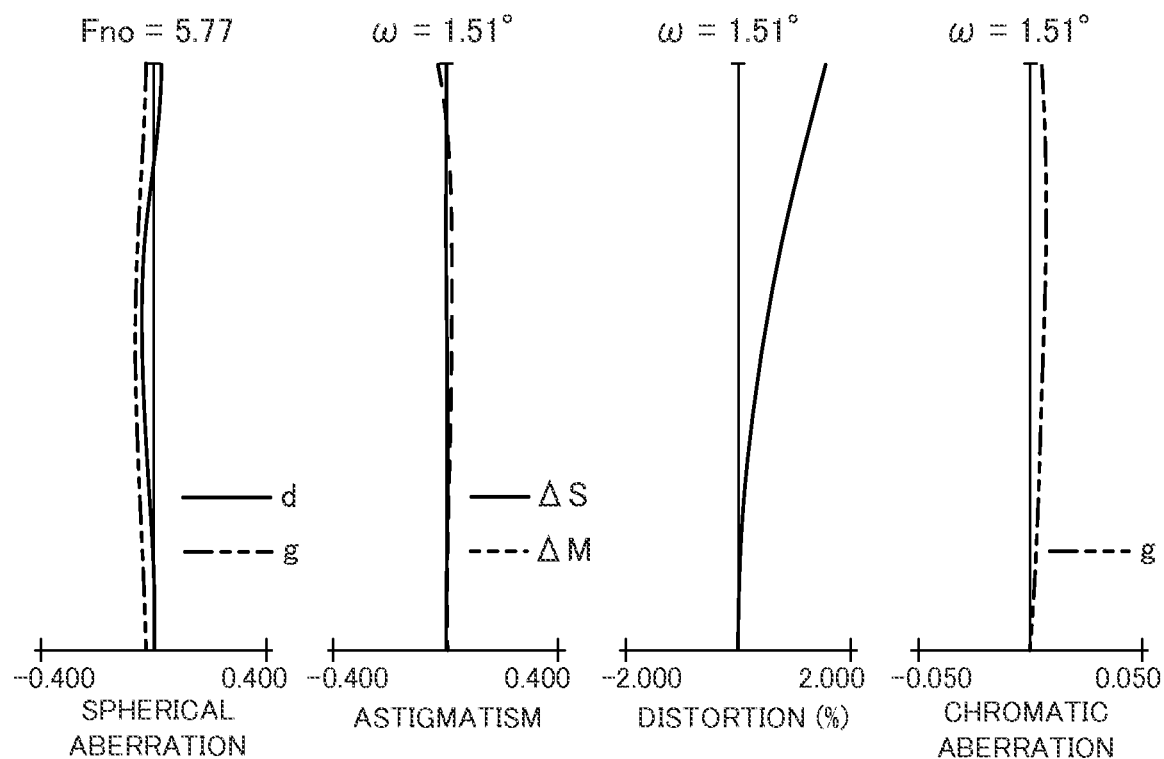

FIGS. 5A and 5B are a cross-sectional diagram and a vertical aberration diagram of lenses, respectively, when the magnification conversion optical unit is not inserted in the optical path in Embodiment 2 of the present invention. FIGS. 6A and 6B are a cross-sectional diagram and a vertical aberration diagram of the lenses, respectively, when the magnification conversion optical unit is inserted in the optical path in Embodiment 2 of the present invention.

Figure 7:
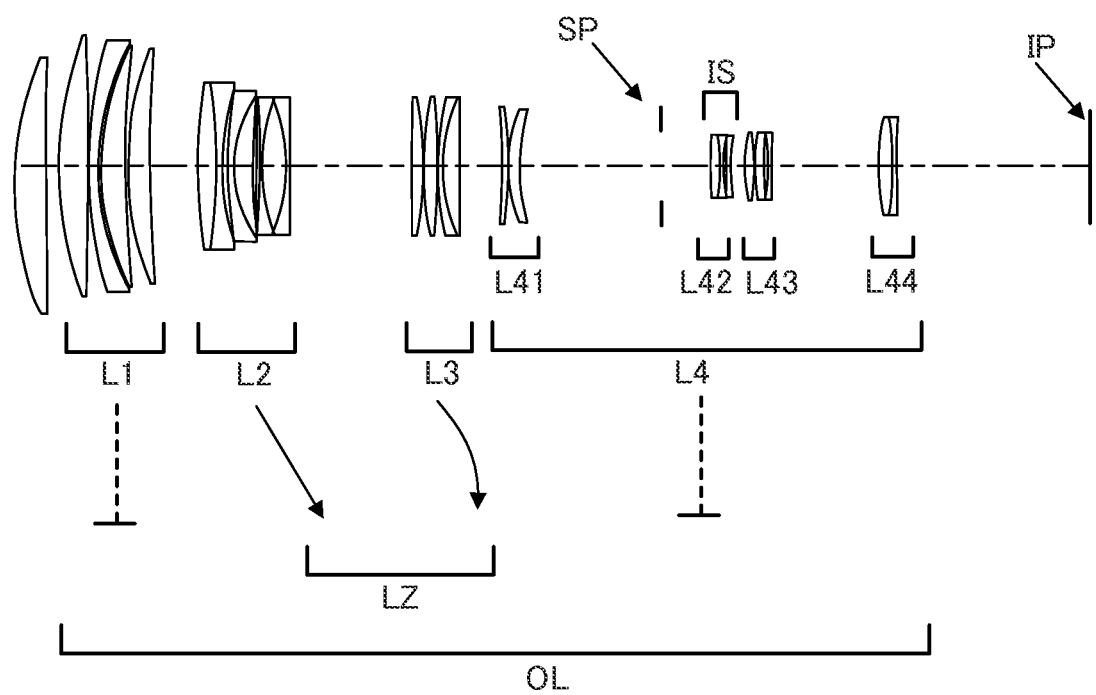
FIG. 7 is a cross-sectional diagram of lenses in a state where a magnification conversion optical unit is not inserted in Embodiment 3 of the present invention.
Figure 8A:
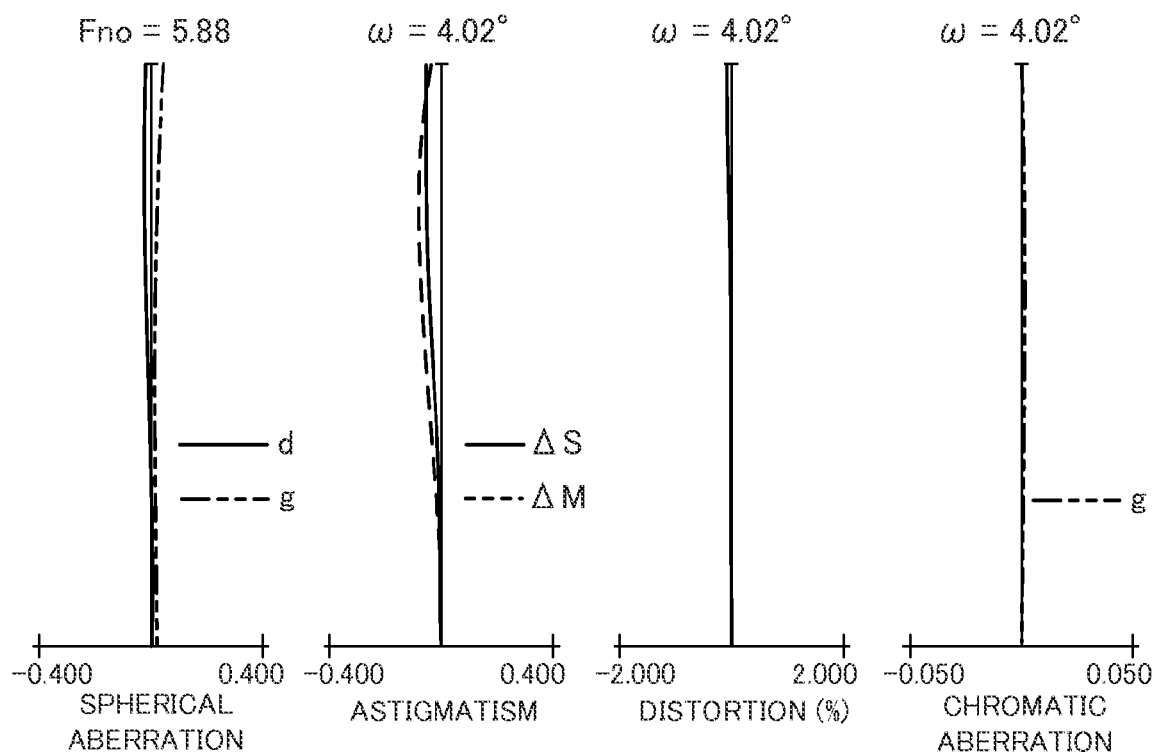
FIGS. 8A and 8B are vertical aberration diagrams of the lenses at a wide angle end and a telephoto end, respectively, in a state where a magnification conversion optical unit is not inserted in Embodiment 3 of the present invention.
Figure 8B:
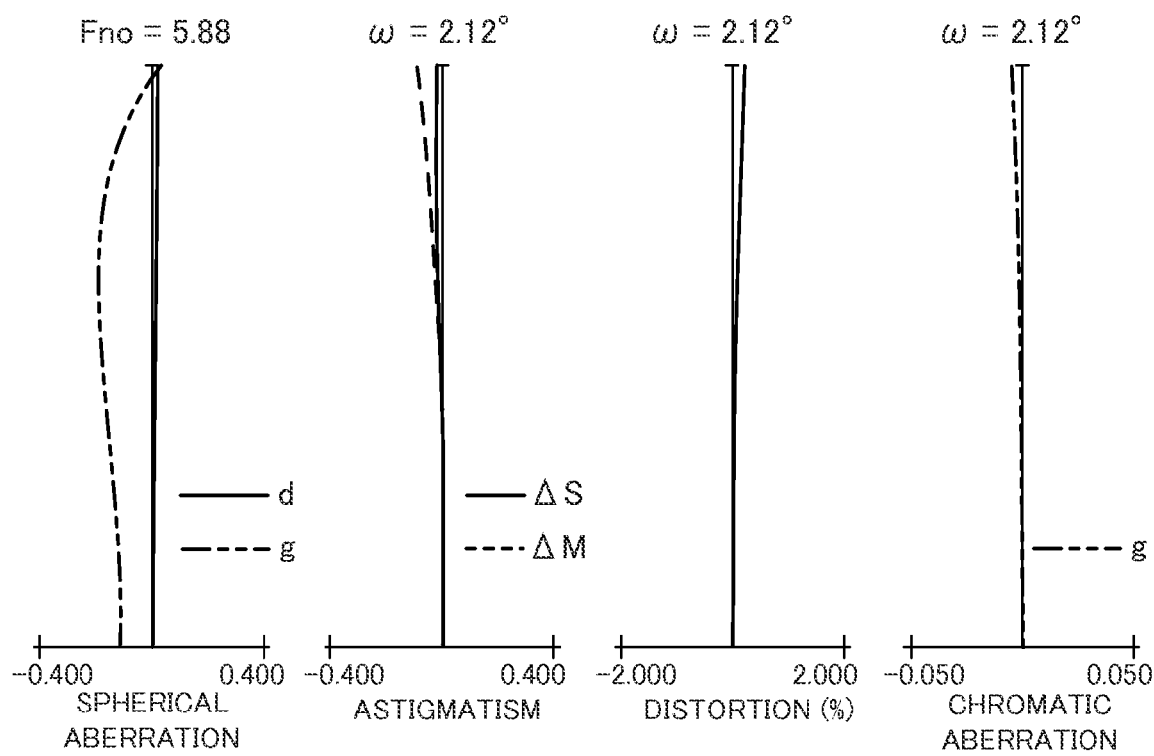
Figure 9:
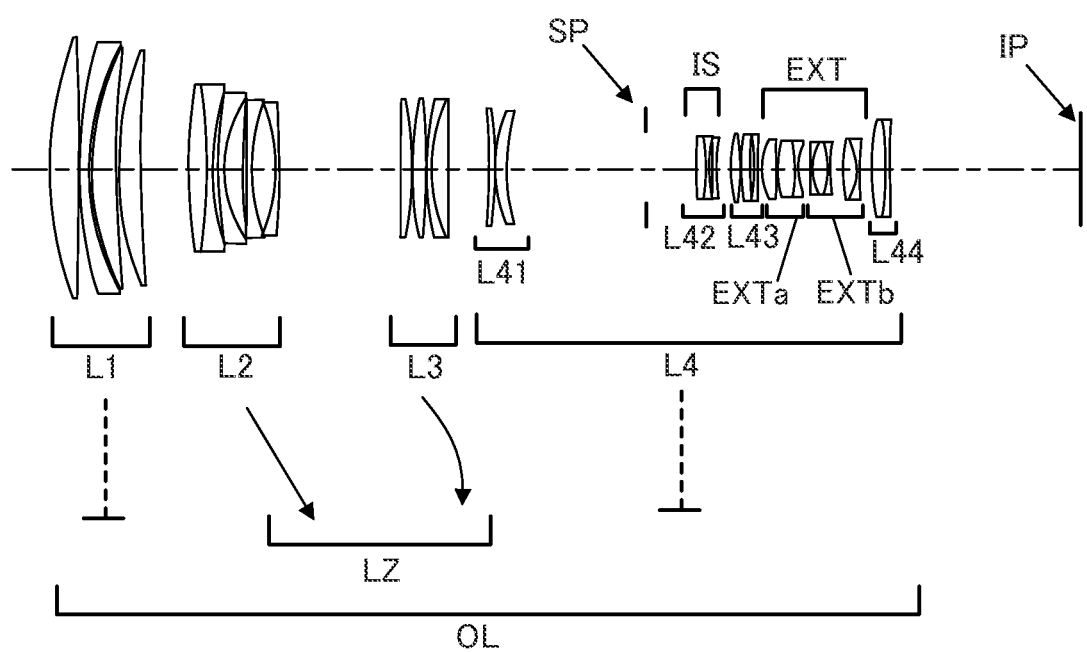
FIG. 9 is a cross-sectional diagram of the lenses in a state where the magnification conversion optical unit is inserted in Embodiment 3 of the present invention.
Figure 10A:
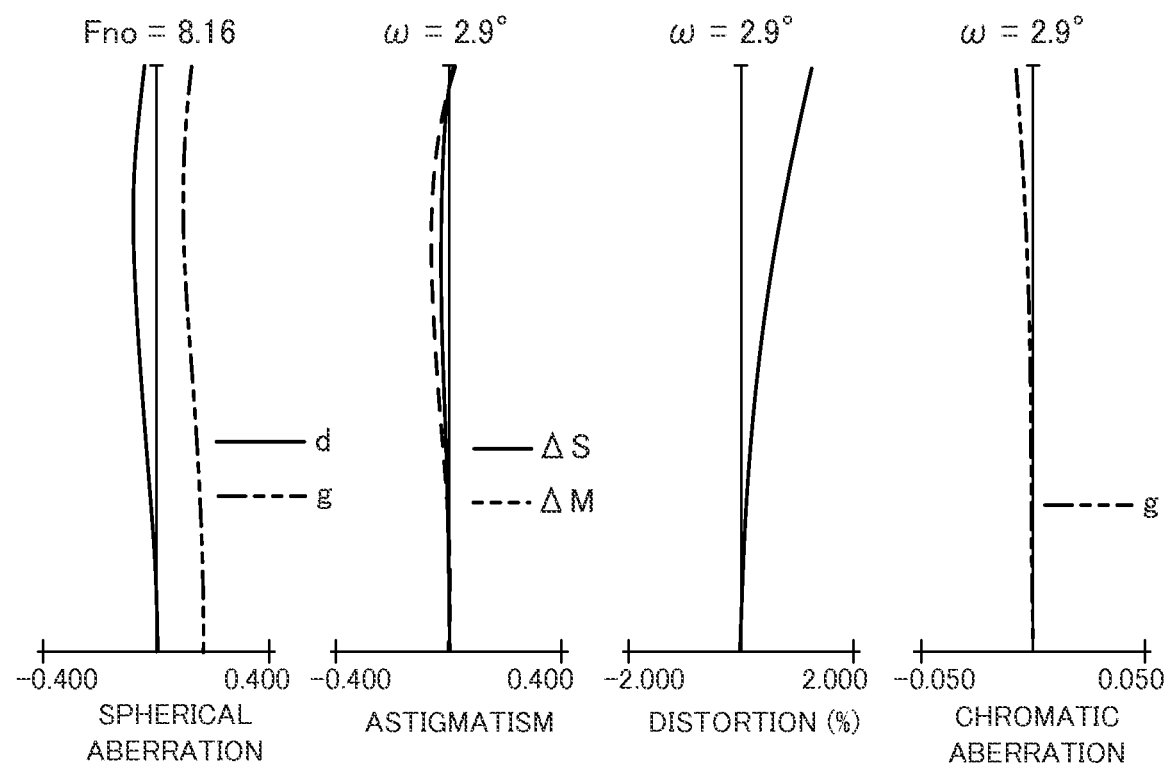
FIGS. 10A and 10B are vertical aberration diagrams of the lenses at the wide angle end and the telephoto end, respectively, in a state where the magnification conversion optical unit is inserted in Embodiment 3 of the present invention.
Figure 10B:
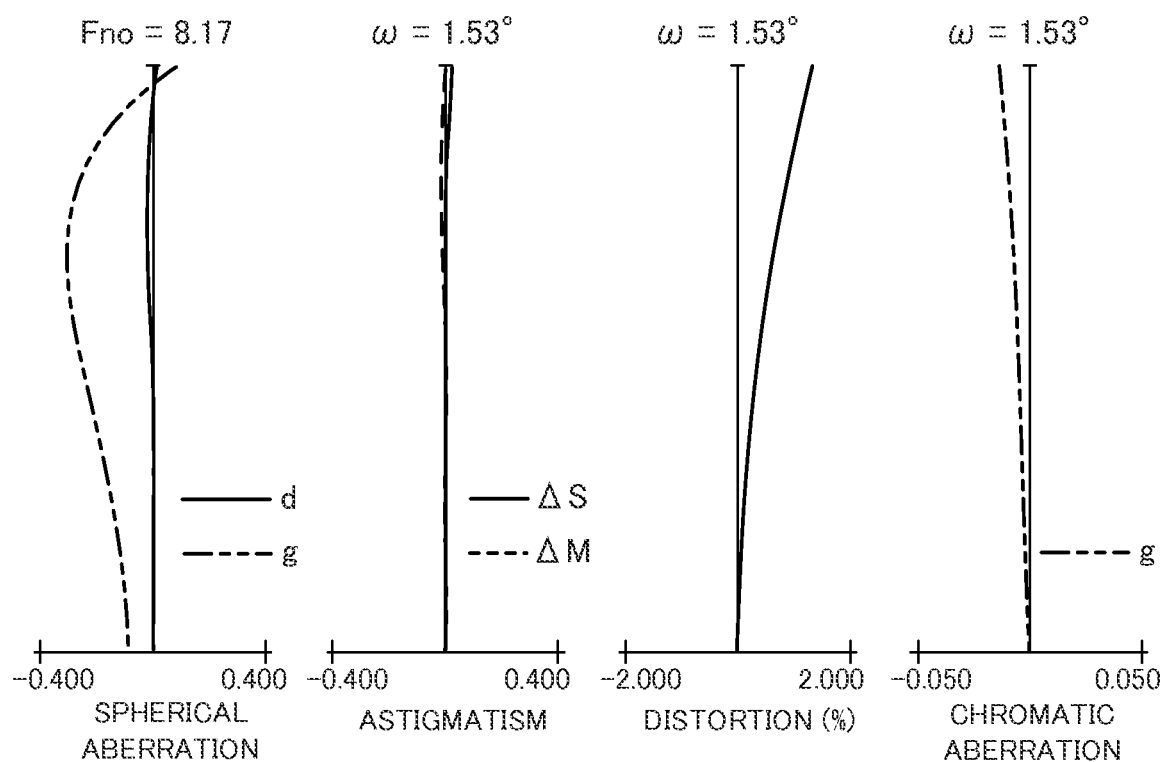

FIG. 7 is a cross-sectional diagram of lenses at the wide angle end when the magnification conversion optical unit is not inserted in the optical path in Embodiment 3 of the present invention. FIGS. 8A and 8B are vertical aberration diagrams at the wide angle end and the telephoto end, respectively, when the magnification conversion optical unit is not inserted in the optical path in Embodiment 3 of the present invention. FIG. 9 is a cross-sectional diagram of the lenses at the wide angle end when the magnification conversion optical unit is inserted in the optical path in Embodiment 3 of the present invention. FIGS. 10A and 10B are vertical aberration diagrams at the wide angle end and the telephoto end, respectively, when the magnification conversion optical unit is inserted in the optical path in Embodiment 3 of the present invention.

Figure 11:
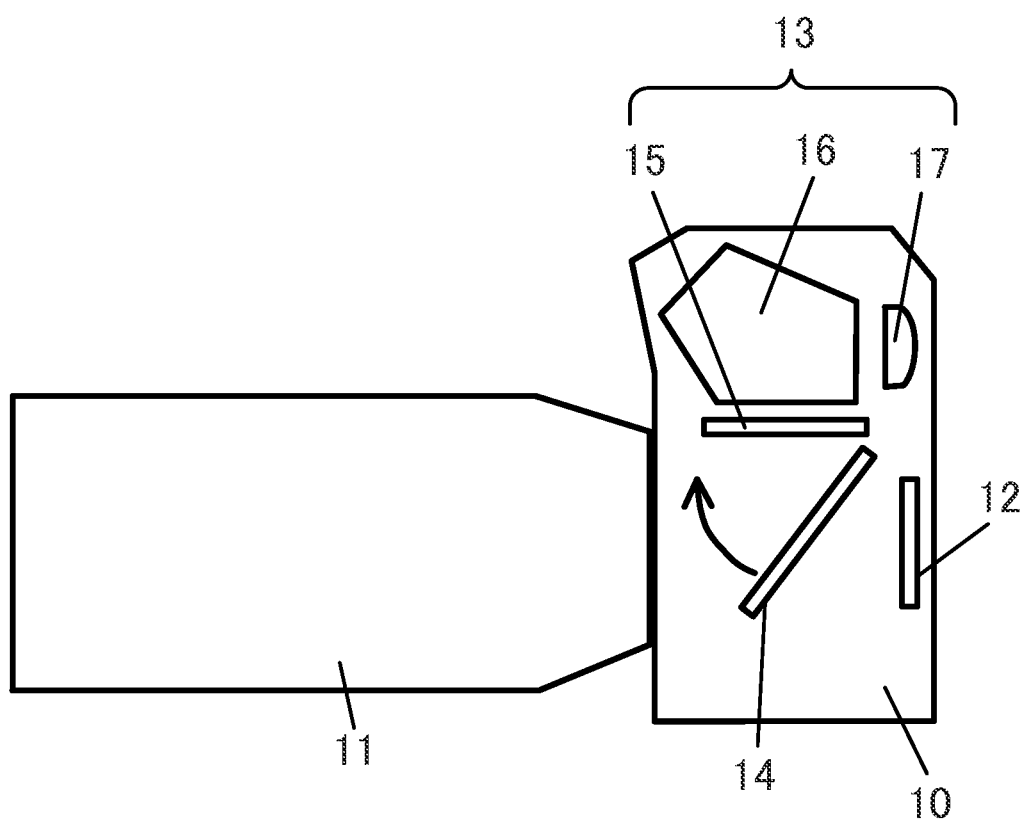
FIG. 11 is a schematic diagram of a main part of an image pickup apparatus in the present invention.

All the cross-sectional diagrams and the vertical aberration diagrams of the lenses illustrate a case in which focusing is performed on an object at infinity. FIG. 11 is a schematic diagram of a main part of an image pickup apparatus that includes the optical system of the present invention. The optical system of each of Embodiments 1 and 3 is a zoom lens. The optical system of Embodiment 2 is a telephoto-type fixed focal length lens.

The optical system of each embodiment is an image pickup lens system that is used for the image pickup apparatus such as a video camera, a digital camera, or a silver-salt film camera. In the cross-sectional diagram of the lenses, a left side is an object side (a front side), and a right side is an image side (a rear side). In the cross-sectional diagram of the lenses, symbol OL denotes an optical system. Symbol i denotes an order of a lens unit counted from the object side, and symbol Li denotes an i-th lens unit. Symbol LZ denotes a zoom unit (a magnification-varying unit). Symbol SP denotes an F-number determining unit that has a function as an aperture stop that determines (limits) an open F-number (Fno) light beam (hereinafter, referred to as an "aperture stop").

Symbol IS denotes an image stabilizing lens unit, which moves in a direction having a component of a direction perpendicular to an optical axis so as to move an imaging position in the direction perpendicular to the optical axis. In other words, an image blur that is generated when the optical system vibrates is corrected. Symbol EXT denotes a magnification conversion optical unit (a built-in extender) having a negative refractive power which is inserted into and removed from an optical path, and in each embodiment, a conversion magnification (a magnifying power of a focal length) M is 1.4. The magnification conversion optical unit EXT can be inserted into and removed from a position where an on-axis light beam converges in the optical system. In this case, a total lens length is constant before and after the insertion or the removal.

Symbol IP denotes an image plane, which corresponds to an image pickup surface of a solid-state image pickup element (a photoelectric conversion element) such as a CCD sensor or a CMOS sensor when it is used as an image pickup optical system such as a video camera or a digital still camera, and corresponds to a film surface when it is used as a silver-salt film camera. Each arrow indicates a movement locus when a zooming is performed from the wide angle end to the telephoto end. In each of the aberration diagrams, symbols d and g denote d-line and g-line, respectively. Symbols ΔM and ΔS denote a meridional image plane and a sagittal image plane, and a chromatic aberration of magnification is represented by the g-line. Symbol ω denotes a half angle of view when taking an image (degree), and symbol Fno denotes an F-number.

In Embodiments 1 and 3, each of the wide angle end and the telephoto end means a zoom position that is obtained when each lens unit is positioned at both ends of a range where it is mechanically movable on the optical axis.

The optical system of Embodiment 1 illustrated in FIGS. 1 and 3 and the optical system of Embodiment 3 illustrated in FIGS. 7 and 9 will be described. In each of the cross-sectional diagrams of the lenses, symbol L1 denotes a first lens unit having a positive refractive power which does not move (i.e. is fixed) in zooming. The first lens unit L1 moves in an optical axis direction in focusing. Symbol LZ denotes a zoom unit including lens units that move for zooming. The zoom unit LZ includes a second lens unit L2 having a negative refractive power which linearly moves to the image side in zooming from the wide angle end to the telephoto end. Furthermore, it includes a third lens unit L3 having a positive refractive power which moves by depicting a locus convex towards the image side in order to correct a variation of an image plane position caused by the zooming.

Symbol L4 denotes a fourth lens unit that does not move in zooming. The fourth lens unit L4 includes a first lens subunit L41 having a positive refractive power, the aperture stop SP, a second lens subunit L42 having a negative refractive power, a third lens subunit L43 having a positive refractive power, and a fourth lens subunit L44 having a positive refractive power. The second lens subunit L42 is the image stabilizing lens unit IS that moves to have the component of the direction perpendicular to the optical axis so as to move the imaging position in the direction perpendicular to the optical axis.

In order to change a range of the focal length of the total system, the magnification conversion optical unit EXT that is insertable and removable between the third lens subunit L43 and the fourth lens subunit L44 is provided.

FIGS. 3 and 9 illustrate an insertion state of the magnification conversion optical unit EXT. The magnification conversion optical unit EXT is, in order from the object side to the image side across the widest air gap, configured by a front lens unit EXTa having a positive refractive power and a rear lens unit EXTb having a negative refractive power. Symbol IP denotes an image plane, which corresponds to the image pickup surface of the solid-state image pickup element (the photoelectric conversion element).

The optical system of the fixed focal length lens of Embodiment 2 illustrated in FIGS. 5A and 6A will be described. In FIGS. 5A and 6A, symbol L1 denotes a first lens unit having a positive refractive power, and symbol SP denotes an aperture stop, symbol L2 denotes a second lens unit having a positive refractive power, symbol L3 denotes a third lens unit having a negative refractive power, and symbol L4 denotes a fourth lens unit having a positive refractive power.

The third lens unit L3 is configured by the image stabilizing lens unit IS that moves to have the component of the direction perpendicular to the optical axis so as to move the imaging position in the direction perpendicular to the optical axis. Furthermore, in order to change the range of the focal length of the total system, the magnification conversion optical unit EXT that is insertable and removable between the third lens unit L3 and the fourth lens unit L4 is provided.

FIG. 6A illustrates a state in which the magnification conversion optical unit EXT is inserted between the third lens unit L3 and the fourth lens unit L4. The magnification conversion optical unit EXT is, in order from the object side to the image side across the widest air gap, configured by a front lens unit EXTa having a positive refractive power and a rear lens unit EXTb having a negative refractive power. Symbol IP denotes an image plane, which corresponds to the image pickup surface of the solid-state image pickup element (the photoelectric conversion element).

The magnification conversion optical unit EXT in the optical system OL of each embodiment is inserted into and removed from a position where an on-axis light beam converges in the optical system. In each embodiment, a length on the optical axis from the aperture stop SP to the image plane IP of the optical system OL is defined as Lp, and a length on the optical axis from a lens surface closest to the object side of the magnification conversion optical unit EXT to the image plane IP when the magnification conversion optical unit EXT is inserted in the optical system OL is defined as Le. In this case, the following conditional expression is satisfied.

$$0.40 < Le/Lp < 0.75 \quad (1)$$

Conditional Expression (1) defines an insertion and removal position of the magnification conversion optical unit EXT in the optical system. Satisfying Conditional Expression (1), a size of the magnification conversion optical unit EXT can be easily reduced. When a value exceeds the lower limit of Conditional Expression (1), the insertion and removal position of the magnification conversion optical unit EXT is too close to the image plane IP and an incident height of an off-axis ray that passes through the magnification conversion optical unit EXT is too high, and therefore it is difficult to reduce the size of the magnification conversion optical unit EXT. When the value exceeds the upper limit of Conditional Expression (1), the insertion and removal position of the magnification conversion optical unit EXT is too close to the aperture stop SP and an incident height of an on-axis ray that passes through the magnification conversion optical unit EXT is too high, and therefore it is difficult to reduce the size of the magnification conversion optical unit EXT. It is more preferred that a numerical range of Conditional Expression (1) is set as follows.

$$0.60 < Le/Lp < 0.74 \quad (1a)$$

Next, a preferred configuration in each embodiment will be described. The magnification conversion optical unit EXT is, in order from the object side to the image side across the widest air gap, configured by the front lens unit EXTa having a positive refractive power and the rear lens unit EXTb having a negative refractive power. It is preferred that the rear lens unit EXTb is configured by including two or more negative lenses and one or more positive lenses.

In the optical system of each embodiment, the magnification conversion optical unit EXT is disposed at a distance from the aperture stop SP, and thus the size of the magnification conversion optical system EXT can be easily reduced. However, when the magnification conversion optical unit EXT is disposed at a distance from the aperture stop SP, the incident height of the off-axis ray that passes through the rear lens unit EXTb having the negative refractive power is high, and therefore it is difficult to correct a field curvature. Accordingly, the rear lens unit EXTb is configured to include at least two negative lenses and at least one positive lens, which prevents the Petzval sum from having an excessively negative value and corrects the field curvature appropriately.

Subsequently, an arrangement of an optical refractive power of the magnification conversion optical unit EXT will be described. When the magnification conversion optical unit EXT is inserted in the optical path, a distance from a rear side principal point of the rear lens unit EXTb having the negative refractive power to the image plane IP is defined as Sk. An interval between the front lens unit EXTa having the positive refractive power and the rear lens unit EXTb having the negative refractive power is defined as e. A focal length of a total system of the optical system in the state where the magnification conversion optical unit EXT is not inserted is defined as f.

In addition, a focal length of the total system of the optical system in the state where the magnification conversion optical unit EXT is inserted in the optical path is defined as f'. A ratio of the focal length f' and the focal length f (i.e. f'/f) is defined as a conversion magnification β. In this case, when a focal length of the rear lens unit EXTb is defined as fn, the following relational expression is satisfied.

$$1/fn = (1-\beta)(1/sk + 1/e)$$

Considering the above expression, the focal length fn always has a positive value when both the distance Sk and the interval e (principal point interval) are positive and the conversion magnification β exceeds 1 (i.e. when the magnification is increased). In addition, if both the principal point interval e and the conversion magnification β are constant, an absolute value of the focal length fn is increased as the distance Sk is enlarged. In other words, if the magnification conversion optical unit EXT is disposed at a distance from the image plane IP, the absolute value of the focal length fn of the rear lens unit EXTb having the negative refractive power can be enlarged and therefore it is advantageous for an optical performance. However, when the magnification conversion optical unit EXT is disposed at a distance from the image plane IP, a distance between the magnification conversion optical unit EXT and the aperture stop SP is shortened and therefore the size of the magnification conversion optical unit EXT is increased.

In each embodiment, the magnification conversion optical unit EXT is, in order from the object side to the image side across the widest air gap, configured by the front lens unit EXTa having the positive refractive power and the rear lens unit EXTb having the negative refractive power. A focal length fn of the rear lens unit EXTb is defined as fn, and a focal length of the magnification conversion optical unit EXT is defined as fe. In this case, it is preferred that the following conditional expression is satisfied.

$$0.2 < fn/fe < 0.6 \tag{2}$$

Conditional Expression (2) defines the focal length of the magnification conversion optical unit EXT. If Conditional Expression (2) is satisfied, the size of the magnification conversion optical unit EXT can be easily reduced and also the performance of the magnification conversion optical unit EXT can be enhanced. When a value of Conditional Expression (2) exceeds the upper limit, an absolute value of the focal length of the rear lens unit EXTb is increased and therefore it is advantageous for the optical performance, but the size of the magnification conversion optical unit EXT is increased. On the other hand, when the value exceeds the lower limit of Conditional Expression (2), the absolute value of the focal length of the rear lens unit EXTb is decreased and therefore it is advantageous to reduce the size of the magnification conversion optical unit EXT, but the Petzval sum is increased in a negative direction and therefore it is difficult to correct astigmatism. It is further preferred that the numerical range of Conditional Expression (2) is set as follows.

$$0.3 < fn/fe < 0.5 \tag{2a}$$

As described above, according to each embodiment, an optical system capable of changing a focal length of a total system while maintaining a size of total of the optical system and an appropriate optical performance can be obtained.

In each embodiment, it is preferred that the optical system OL includes, at the object side relative to a position where the magnification conversion optical unit EXT is inserted, a lens unit having a negative refractive power that moves in a direction having a component of a direction perpendicular to the optical axis so as to move an imaging position in the direction perpendicular to the optical axis. According to this configuration, an image stabilizing operation (an anti-shake operation) can be effectively performed without increasing an image stabilizing sensitivity.

In the optical system of the zoom lens in each of Embodiments 1 and 3, a focal length of a front optical system at the object side relative to a position where the magnification conversion optical unit EXT is inserted at the telephoto end is defined as fFt, and a focal length of the total system at the telephoto end is defined as ft. In this case, it is preferred that the following conditional expression is satisfied.

$$0.3 < ft/fFt \leq 1.0 \tag{3}$$

In the optical system including the fixed focal length lens of Embodiment 2, a focal length of a front optical system at the object side relative to a position where the magnification conversion optical unit EXT is inserted is defined as fFa, and a focal length of the total system of the optical system is defined as fa. In this case, it is preferred that the following conditional expression is satisfied.

$$0.3 < fa/fFa \leq 1.0 \tag{3X}$$

Conditional Expression (3) is a conditional expression which is preferably satisfied when the optical system is a zoom lens, and conditional expression (3X) is a conditional expression which is preferably satisfied when the optical system is a fixed focal length lens, and these conditional expressions technologically have the same meaning. Each of Conditional Expressions (3) and (3X) defines an incident angle of an on-axis ray that enters the magnification conversion optical unit EXT. When Conditional Expressions (3) and (3X) are satisfied, an incident height of the ray that heads to an angle of view in the periphery of a screen can be appropriately set, and therefore an exit pupil condition that can sufficiently ensure a light intensity (a light amount) in the periphery of the screen is obtained when the optical system is used for an image pickup apparatus.

When a value exceeds the lower limit of Conditional Expressions (3) or (3X), a ray that enters the magnification conversion optical unit EXT comes close to be afocal and the incident height of the on-axis ray that passes through the magnification conversion optical unit EXT becomes too high, and therefore it is difficult to reduce the size of the magnification conversion optical unit EXT. On the other hand, when a value exceeds the upper limit of Conditional Expressions (3) or (3X), the ray entering the magnification conversion optical unit EXT is converged and therefore it is advantageous for the reduction in size of the magnification conversion optical unit EXT, but a sensitivity of an image plane position with respect to an insertion position of the magnification conversion optical unit EXT becomes too high and therefore it is difficult to manufacture the optical system. It is further preferred that the numerical range of each of Conditional Expressions (3) and (3X) is set as follows.

$$0.4 < ft/fFt < 0.9 \tag{3a}$$

$$0.4 < fa/fFa \leq 0.9 \tag{3Xa}$$

As described above, according to each embodiment, an optical system capable of changing a focal length of a total system while maintaining a size of total of the optical system and an appropriate optical performance can be obtained.

Hereinafter, Numerical Examples 1 to 3 that correspond to Embodiments 1 to 3, respectively, of the present invention are indicated. In each numerical examples, symbol denotes an order of a surface counted from the object side, symbol ri denotes a radius of curvature of an i-th optical surface, symbol di denotes an interval between the i-th surface and the (i+1)th surface, and symbols ndi and vdi denote a refractive index and Abbe number of an i-th optical member, respectively. Symbol BF denotes a back focus, which is a distance from a final lens surface to an image plane.

Each of the numerical examples relating to the magnification conversion optical unit EXT is indicated with respect to a lens surface (a 41st surface in Numerical Examples 1 and 3, or a 24th surface in Numerical Example 2) which is located immediately in front at the object side relative to a position where the magnification conversion optical unit EXT is inserted in the optical path. Table 1 indicates a numerical value that corresponds to each of the conditional expressions in Numerical Examples 1 to 3.

Numerical Example 1

<IMAGE PICKUP LENS IN STATE WHERE MAGNIFICATION CONVERSION OPTICAL SYSTEM IS NOT INSERTED>

Unit mm
Surface data

| Surface Number | r | d | nd | vd | Effective diameter |
|---|---|---|---|---|---|
| 1 | 304.970 | 8.16 | 1.48749 | 70.2 | 100.06 |
| 2 | −999.267 | 0.30 | | | 99.55 |
| 3 | 299.609 | 3.55 | 1.80610 | 33.3 | 97.75 |
| 4 | 127.050 | 0.11 | | | 94.89 |
| 5 | 127.907 | 12.03 | 1.43387 | 95.1 | 94.90 |
| 6 | 3844.966 | 0.60 | | | 94.24 |
| 7 | 121.044 | 11.08 | 1.49700 | 81.5 | 91.58 |
| 8 | 942.757 | (variable) | | | 90.13 |
| 9 | 156.356 | 6.56 | 1.90366 | 31.3 | 48.10 |
| 10 | −98.955 | 2.30 | 1.69680 | 55.5 | 47.35 |
| 11 | 80.378 | 3.14 | | | 43.00 |
| 12 | 488.480 | 2.10 | 1.69680 | 55.5 | 42.64 |
| 13 | 50.627 | 5.43 | 1.90366 | 31.3 | 40.64 |
| 14 | 299.399 | 2.12 | | | 39.91 |
| 15 | −162.580 | 2.00 | 1.83481 | 42.7 | 39.75 |
| 16 | 89.993 | 5.17 | | | 38.58 |
| 17 | −74.380 | 1.95 | 1.83481 | 42.7 | 38.56 |
| 18 | 1006.217 | (variable) | | | 39.59 |
| 19 | −1013.600 | 4.23 | 1.49700 | 81.5 | 41.74 |
| 20 | −100.198 | 0.15 | | | 42.42 |
| 21 | 162.423 | 4.43 | 1.49700 | 81.5 | 43.43 |
| 22 | −274.369 | 0.15 | | | 43.59 |
| 23 | 82.585 | 2.20 | 1.90366 | 31.3 | 43.76 |
| 24 | 53.309 | 6.69 | 1.49700 | 81.5 | 42.87 |
| 25 | 1003.667 | (variable) | | | 42.71 |
| 26 | −65.984 | 2.00 | 1.76182 | 26.5 | 39.89 |
| 27 | −97.801 | 17.75 | | | 40.56 |
| 28 | 102.573 | 5.96 | 1.59282 | 68.6 | 42.27 |
| 29 | −127.044 | 4.25 | | | 42.05 |
| 30 (stop) | ∞ | 22.15 | | | 39.75 |
| 31 | 139.420 | 3.17 | 1.80610 | 33.3 | 31.01 |
| 32 | −139.420 | 1.55 | 1.51633 | 64.1 | 30.84 |
| 33 | 57.943 | 3.27 | | | 30.01 |
| 34 | −131.673 | 1.50 | 1.65160 | 58.5 | 30.01 |
| 35 | 71.997 | 3.68 | | | 30.35 |
| 36 | 81.168 | 4.07 | 1.62299 | 58.2 | 31.95 |
| 37 | −120.665 | 0.15 | | | 32.10 |
| 38 | 174.462 | 3.04 | 1.62299 | 58.2 | 32.11 |
| 39 | −122.981 | 1.10 | | | 32.03 |
| 40 | −65.541 | 1.60 | 1.80610 | 33.3 | 31.98 |
| 41 | 431.470 | 45.38 | | | 32.27 |
| 42 | 67.652 | 7.37 | 1.57501 | 41.5 | 41.71 |
| 43 | −105.478 | 2.00 | 1.88300 | 40.8 | 41.48 |
| 44 | 435.743 | 68.49 | | | 41.34 |
| Image plane | ∞ | | | | |

Various kinds of data
Zoom ratio 1.90

| Focal length | 205.00 | 389.99 |
|---|---|---|
| F-number | 4.12 | 4.12 |
| Half angle of view (degree) | 6.02 | 3.18 |
| Image height | 21.64 | 21.64 |
| Total lens length | 389.84 | 389.84 |
| BF | 68.49 | 68.49 |
| d8 | 43.02 | 78.02 |
| d18 | 25.57 | 3.10 |
| d25 | 38.33 | 25.80 |

Zoom lens unit data

| Unit | Start Surface | Focal length |
|---|---|---|
| 1 | 1 | 191.69 |
| 2 | 9 | −41.40 |
| 3 | 19 | 81.43 |
| 4 | 26 | 214.58 |
| 41 | 26 | 132.25 |
| 42 | 31 | −67.82 |
| 43a | 36 | 97.67 |

The lens unit 41 corresponds to the first lens subunit L41, the lens unit 42 corresponds to the second lens subunit L42, and the lens unit 43a corresponds to a combination of the third lens subunit L43 and the fourth lens subunit L44.

<IMAGE PICKUP LENS IN STATE WHERE MAGNIFICATION CONVERSION OPTICAL SYSTEM IS INSERTED>
SURFACE NUMBERS 1 TO 40 ARE SAME AS THOSE OF IMAGE PICKUP LENS IN STATE WHERE MAGNIFICATION CONVERSION OPTICAL SYSTEM IS NOT INSERTED

Unit mm
Surface data

| Surface Number | r | d | nd | vd | Effective diameter |
|---|---|---|---|---|---|
| 41 | 431.470 | 1.99 | | | 32.27 |
| 42 | 27.767 | 5.24 | 1.54072 | 47.2 | 25.43 |
| 43 | 1022.861 | 0.30 | | | 24.41 |
| 44 | 31.864 | 4.64 | 1.60342 | 38.0 | 22.73 |
| 45 | −158.238 | 1.15 | 1.90366 | 31.3 | 21.12 |
| 46 | 23.190 | 9.85 | | | 19.05 |
| 47 | 98.723 | 0.95 | 1.88300 | 40.8 | 18.25 |
| 48 | 18.019 | 6.40 | 1.72047 | 34.7 | 18.16 |
| 49 | −39.070 | 0.95 | 1.88300 | 40.8 | 18.39 |
| 50 | 51.545 | 0.54 | | | 18.72 |
| 51 | 35.033 | 6.01 | 1.61340 | 44.3 | 19.32 |
| 52 | −26.415 | 1.05 | 1.59282 | 68.6 | 19.64 |
| 53 | 60.435 | 6.31 | | | 20.03 |

-continued

<IMAGE PICKUP LENS IN STATE WHERE MAGNIFICATION
CONVERSION OPTICAL SYSTEM IS INSERTED>
SURFACE NUMBERS 1 TO 40 ARE SAME AS THOSE OF
IMAGE PICKUP LENS IN STATE WHERE MAGNIFICATION
CONVERSION OPTICAL SYSTEM IS NOT INSERTED

| | | | | | |
|---|---|---|---|---|---|
| 54 | 67.652 | 7.37 | 1.57501 | 41.5 | 41.71 |
| 55 | −105.478 | 2.00 | 1.88300 | 40.8 | 41.48 |
| 56 | 435.743 | 68.46 | | | 41.34 |
| Image plane | ∞ | | | | |

Various kinds of data
Zoom ratio 1.90

| | Wide angle | Intermediate |
|---|---|---|
| Focal length | 287.00 | 545.98 |
| F-number | 5.77 | 5.77 |
| Half angle of view (degree) | 4.31 | 2.27 |
| Image height | 21.64 | 21.64 |
| Total lens length | 389.84 | 389.84 |
| BF | 68.49 | 68.49 |
| d8 | 43.02 | 78.02 |
| d18 | 25.57 | 3.10 |
| d25 | 38.33 | 25.80 |

Zoom lens unit data

| Unit | Start Surface | Focal length |
|---|---|---|
| 1 | 1 | 191.69 |
| 2 | 9 | −41.40 |
| 3 | 19 | 81.43 |
| 4 | 26 | 1422.63 |
| 41 | 26 | 132.25 |
| 42 | 31 | −67.82 |
| 43 | 36 | 125.87 |
| EXT | 42 | −176.38 |
| 44 | 54 | 265.82 |

The lens unit 41 corresponds to the first lens subunit L41, the lens unit 42 corresponds to the second lens subunit L42, the lens unit 43 corresponds to the third lens subunit L43, The lens unit EXT corresponds to the magnification conversion optical unit EXT, and the lens unit 44 corresponds to the fourth lens subunit L44.

Numerical Example 2

<IMAGE PICKUP LENS IN STATE WHERE MAGNIFICATION CONVERSION
OPTICAL SYSTEM IS NOT INSERTED>

Unit mm
Surface data

| Surface Number | r | d | nd | vd | Effective diameter |
|---|---|---|---|---|---|
| 1 | 231.936 | 19.37 | 1.49700 | 81.5 | 142.02 |
| 2 | −832.138 | 42.11 | | | 140.91 |
| 3 | 150.208 | 14.22 | 1.49700 | 81.5 | 117.55 |
| 4 | 2233.737 | 2.67 | | | 115.91 |
| 5 | −937.909 | 5.90 | 1.83481 | 42.7 | 115.80 |
| 6 | 242.160 | 39.21 | | | 110.65 |
| 7 | 114.021 | 14.31 | 1.43387 | 95.1 | 98.37 |
| 8 | 5076.068 | 0.50 | | | 96.76 |
| 9 | 83.383 | 5.00 | 1.51633 | 64.1 | 87.89 |
| 10 | 64.570 | 45.77 | | | 81.76 |
| 11 | 542.338 | 5.22 | 1.80518 | 25.4 | 64.66 |
| 12 | −259.855 | 3.30 | 1.83481 | 42.7 | 63.88 |
| 13 | 131.034 | 88.42 | | | 60.92 |
| 14 (stop) | ∞ | 10.55 | | | 42.70 |

-continued

<IMAGE PICKUP LENS IN STATE WHERE MAGNIFICATION CONVERSION OPTICAL SYSTEM IS NOT INSERTED>

| | | | | | |
|---|---|---|---|---|---|
| 15 | 129.417 | 2.00 | 1.84666 | 23.9 | 40.10 |
| 16 | 67.394 | 11.02 | 1.60311 | 60.6 | 39.23 |
| 17 | −398.893 | 11.22 | | | 37.63 |
| 18 | 98.335 | 3.79 | 1.84666 | 23.9 | 33.76 |
| 19 | −615.504 | 1.65 | 1.60311 | 60.6 | 33.34 |
| 20 | 48.880 | 3.88 | | | 32.21 |
| 21 | −153.840 | 1.60 | 1.80400 | 46.6 | 32.22 |
| 22 | 107.741 | 1.29 | | | 32.62 |
| 23 | 101.203 | 3.00 | 1.72000 | 43.7 | 33.27 |
| 24 | −655.824 | 42.00 | | | 33.43 |
| 25 | 71.399 | 4.27 | 1.74950 | 35.0 | 40.81 |
| 26 | 676.944 | 1.90 | 1.84666 | 23.9 | 40.55 |
| 27 | 104.236 | 83.15 | | | 40.00 |
| Image plane | ∞ | | | | |
| Focal length | | | 585.10 | | |
| F-number | | | 4.12 | | |
| Half angle of view (degree) | | | 2.12 | | |
| Image height | | | 21.64 | | |
| Total lens length | | | 467.32 | | |
| BF | | | 83.15 | | |

Lens unit data

| Unit | Start Surface | Focal length |
|---|---|---|
| 1 | 1 | 585.11 |

<IMAGE PICKUP LENS IN STATE WHERE MAGNIFICATION CONVERSION OPTICAL SYSTEM IS INSERTED>
SURFACE NUMBERS 1 TO 23 ARE SAME AS THOSE OF IMAGE PICKUP LENS IN STATE WHERE MAGNIFICATION CONVERSION OPTICAL SYSTEM IS NOT INSERTED

Unit mm
Surface data

| Surface Number | r | d | nd | vd | Effective diameter |
|---|---|---|---|---|---|
| 24 | −655.824 | 1.94 | | | 33.43 |
| 25 | 28.242 | 6.02 | 1.54072 | 47.2 | 31.05 |
| 26 | 1347.418 | 0.30 | | | 30.47 |
| 27 | 39.358 | 4.94 | 1.60342 | 38.0 | 28.66 |
| 28 | −126.324 | 1.15 | 1.90366 | 31.3 | 27.66 |
| 29 | 26.021 | 8.88 | | | 25.00 |
| 30 | 88.933 | 0.95 | 1.88300 | 40.8 | 24.75 |
| 31 | 17.394 | 8.40 | 1.72047 | 34.7 | 24.01 |
| 32 | −35.054 | 0.95 | 1.88300 | 40.8 | 24.02 |
| 33 | 63.988 | 0.17 | | | 24.33 |
| 34 | 32.424 | 4.64 | 1.61340 | 44.3 | 25.09 |
| 35 | −120.846 | 1.05 | 1.59282 | 68.6 | 25.04 |
| 36 | 45.785 | 2.61 | | | 24.92 |
| 37 | 71.399 | 4.27 | 1.74950 | 35.0 | 40.81 |
| 38 | 676.944 | 1.90 | 1.84666 | 23.9 | 40.55 |
| 39 | 104.236 | 83.15 | | | 40.00 |
| Image plane | ∞ | | | | |
| Focal length | | | 819.00 | | |
| F-number | | | 5.77 | | |
| Half angle of view (degree) | | | 1.51 | | |
| Image height | | | 21.64 | | |
| Total lens length | | | 467.32 | | |
| BF | | | 83.15 | | |

Lens unit data

| Unit | Start Surface | Focal length |
|---|---|---|
| 1 | 1 | 801.87 |
| 2 | 25 | −187.35 |
| 3 | 37 | 355.69 |

The first unit corresponds to a combination of the first lens unit L1, the second unit L2, and the third lens unit L3. The second unit corresponds to the magnification conversion optical unit EXT. The third unit corresponds to the fourth lens unit L4.

Numerical Example 3

<IMAGE PICKUP LENS IN STATE WHERE MAGNIFICATION CONVERSION OPTICAL SYSTEM IS NOT INSERTED>

Unit mm
Surface data

| Surface Number | r | d | nd | vd | Effective diameter |
|---|---|---|---|---|---|
| 1 | 145.014 | 11.48 | 1.48749 | 70.2 | 99.49 |
| 2 | −1333.836 | 0.30 | | | 99.07 |
| 3 | 180.986 | 3.55 | 1.90366 | 31.3 | 96.05 |
| 4 | 97.490 | 1.07 | | | 92.03 |
| 5 | 105.938 | 9.71 | 1.43387 | 95.1 | 92.03 |
| 6 | 450.929 | 0.60 | | | 91.64 |
| 7 | 118.185 | 9.10 | 1.49700 | 81.5 | 89.70 |
| 8 | 750.636 | (variable) | | | 88.99 |
| 9 | 174.712 | 7.53 | 1.90366 | 31.3 | 64.29 |
| 10 | −204.573 | 2.30 | 1.69680 | 55.5 | 63.24 |
| 11 | 99.246 | 2.65 | | | 57.67 |
| 12 | 249.936 | 2.10 | 1.69680 | 55.5 | 57.64 |
| 13 | 50.981 | 7.19 | 1.90366 | 31.3 | 53.91 |
| 14 | 240.231 | 1.46 | | | 53.39 |
| 15 | 5349.687 | 2.00 | 1.83481 | 42.7 | 53.36 |
| 16 | 66.245 | 9.53 | | | 50.31 |
| 17 | −72.103 | 1.95 | 1.83481 | 42.7 | 50.31 |
| 18 | −321.471 | (variable) | | | 51.72 |
| 19 | 560.513 | 4.95 | 1.49700 | 81.5 | 52.64 |
| 20 | −166.896 | 0.15 | | | 53.07 |
| 21 | 142.101 | 5.23 | 1.49700 | 81.5 | 53.71 |
| 22 | −627.922 | 0.15 | | | 53.63 |
| 23 | 120.487 | 2.20 | 1.90366 | 31.3 | 53.25 |
| 24 | 67.178 | 6.47 | 1.49700 | 81.5 | 52.05 |
| 25 | −4634.016 | (variable) | | | 51.92 |
| 26 | −180.130 | 2.00 | 1.76182 | 26.5 | 44.22 |
| 27 | −226.825 | 0.20 | | | 44.23 |
| 28 | 58.729 | 4.35 | 1.51633 | 64.1 | 43.46 |
| 29 | 85.121 | 55.10 | | | 42.43 |
| 30 (stop) | ∞ | 19.72 | | | 27.80 |
| 31 | 127.332 | 3.73 | 1.80610 | 33.3 | 23.41 |
| 32 | −127.332 | 1.55 | 1.51633 | 64.1 | 23.25 |
| 33 | 63.359 | 1.43 | | | 22.92 |
| 34 | −192.972 | 1.50 | 1.75500 | 52.3 | 22.92 |
| 35 | 65.062 | 5.54 | | | 23.11 |
| 36 | 63.797 | 3.47 | 1.57099 | 50.8 | 25.46 |
| 37 | −69.738 | 0.15 | | | 25.56 |
| 38 | 71.251 | 3.86 | 1.51633 | 64.1 | 25.43 |
| 39 | 286.976 | 1.57 | | | 24.95 |
| 40 | −62.222 | 1.60 | 1.91082 | 35.3 | 24.95 |
| 41 | 247.077 | 41.72 | | | 25.24 |
| 42 | 86.326 | 5.44 | 1.63980 | 34.5 | 37.18 |
| 43 | −128.802 | 2.00 | 1.91082 | 35.3 | 37.16 |
| 44 | 2392.470 | 75.70 | | | 37.28 |
| Image plane | ∞ | | | | |

Various kinds of data
Zoom ratio 1.90

| | Wide angle | Telephoto |
|---|---|---|
| Focal length | 307.50 | 585.00 |
| F-number | 5.88 | 5.88 |
| Half angle of view (degree) | 4.02 | 2.12 |
| Image height | 21.64 | 21.64 |
| Total lens length | 405.00 | 405.00 |
| BF | 75.70 | 75.70 |

-continued

<IMAGE PICKUP LENS IN STATE WHERE MAGNIFICATION
CONVERSION OPTICAL SYSTEM IS NOT INSERTED>

| | | |
|---|---|---|
| d8 | 18.39 | 37.89 |
| d18 | 47.25 | 1.00 |
| d25 | 17.06 | 43.81 |

Zoom lens unit data

| Unit | Start Surface | Focal length |
|---|---|---|
| 1 | 1 | 165.18 |
| 2 | 9 | −54.12 |
| 3 | 19 | 102.91 |
| 4 | 26 | −4228.60 |
| 41 | 26 | 494.13 |
| 42 | 31 | −68.54 |
| 43a | 36 | 106.43 |

The lens unit 41 corresponds to the first lens subunit L41, the lens unit 42 corresponds to the second lens subunit L42, and the lens unit 43a corresponds to a combination of the third lens subunit L43 and the fourth lens subunit L44.

<IMAGE PICKUP LENS IN STATE WHERE MAGNIFICATION
CONVERSION OPTICAL SYSTEM IS INSERTED>
SURFACE NUMBERS 1 TO 40 ARE SAME AS THOSE OF IMAGE
PICKUP LENS IN STATE WHERE MAGNIFICATION CONVERSION
OPTICAL SYSTEM IS NOT INSERTED

Unit mm
Surface data

| Surface Number | r | d | nd | vd | Effective diameter |
|---|---|---|---|---|---|
| 41 | 247.077 | 1.95 | | | 25.24 |
| 42 | 27.472 | 5.94 | 1.54072 | 47.2 | 22.83 |
| 43 | −203.434 | 0.30 | | | 22.16 |
| 44 | 40.006 | 5.73 | 1.60342 | 38.0 | 21.36 |
| 45 | −52.616 | 1.15 | 1.90366 | 31.3 | 19.86 |
| 46 | 26.481 | 6.12 | | | 18.68 |
| 47 | 179.589 | 0.95 | 1.88300 | 40.8 | 19.07 |
| 48 | 20.072 | 6.40 | 1.72047 | 34.7 | 19.05 |
| 49 | −30.181 | 0.95 | 1.88300 | 40.8 | 19.28 |
| 50 | 120.462 | 4.05 | | | 19.71 |
| 51 | 107.240 | 6.11 | 1.61340 | 44.3 | 21.51 |
| 52 | −18.463 | 1.05 | 1.59282 | 68.6 | 21.87 |
| 53 | 131.089 | 1.02 | | | 22.73 |
| 54 | 86.326 | 5.44 | 1.63980 | 34.5 | 37.18 |
| 55 | −128.802 | 2.00 | 1.91082 | 35.3 | 37.16 |
| 56 | 2392.470 | 75.70 | | | 37.28 |
| Image surface | ∞ | | | | |

Various kinds of data
Zoom ratio 1.90

| | Wide angle | Telephoto |
|---|---|---|
| Focal length | 427.00 | 812.33 |
| F-number | 8.16 | 8.17 |
| Half angle of view (degree) | 2.90 | 1.53 |
| Image height | 21.64 | 21.64 |
| Total lens length | 405.00 | 405.00 |
| BF | 75.70 | 75.70 |
| d8 | 18.39 | 37.89 |
| d18 | 47.25 | 1.00 |
| d25 | 17.06 | 43.81 |

Zoom lens unit data

| Unit | Start Surface | Focal length |
|---|---|---|
| 1 | 1 | 165.18 |
| 2 | 9 | −54.12 |
| 3 | 19 | 102.91 |

-continued

<IMAGE PICKUP LENS IN STATE WHERE MAGNIFICATION
CONVERSION OPTICAL SYSTEM IS INSERTED>
SURFACE NUMBERS 1 TO 40 ARE SAME AS THOSE OF IMAGE
PICKUP LENS IN STATE WHERE MAGNIFICATION CONVERSION
OPTICAL SYSTEM IS NOT INSERTED

| | | |
|---|---|---|
| 4 | 26 | −123.88 |
| 41 | 26 | 494.13 |
| 42 | 31 | −68.54 |
| 43 | 36 | 158.84 |
| EXT | 42 | −217.54 |
| 44 | 54 | 200.41 |

The lens unit 41 corresponds to the first lens subunit L41, the lens unit 42 corresponds to the second lens subunit L42, the lens unit 43 corresponds to the third lens subunit L43, The lens unit EXT corresponds to the magnification conversion optical unit EXT, and the lens unit 44 corresponds to the fourth lens subunit L44.

TABLE 1

| CONDITIONAL EXPRESSION | NUMERICAL EXAMPLE 1 | NUMERICAL EXAMPLE 2 | NUMERICAL EXAMPLE 3 |
|---|---|---|---|
| (1) | 0.72 | 0.71 | 0.73 |
| (2) | 0.44 | 0.46 | 0.34 |
| (3), (3X) | 0.74 | 0.73 | 0.59 |

Next, referring to FIG. 11, an embodiment in which the optical system of the present invention is used as an image pickup optical system will be described. In FIG. 11, reference numeral 10 denotes a single-lens reflex camera body, and reference numeral 11 denotes an interchangeable lens that mounts the optical system of the present invention. Reference numeral 12 denotes a photosensitive surface such as a silver-salt film that records an object image obtained through the optical system 11 or a solid-state image pickup element (a photoelectric conversion element) that receives light of the object image (an optical image). Reference numeral 13 denotes a finder optical system that observes the object image obtained from the optical system 11, and reference numeral 14 denotes a quick return mirror that rotates to transmit the object image from the optical system 11 by switching the transmissions to the photosensitive surface 12 and the finder optical system 13.

When the object image is observed by a finder, the object image that is imaged on a focusing plate 15 via the quick return mirror 14 is changed to be an erected image by a pentaprism 16, and then the image is magnified and observed using an eyepiece optical system 17. When taking an image, the quick return mirror 14 rotates in an arrow direction in FIG. 11 and the object image is imaged on the photosensitive surface 12 (a photosensitive surface recording unit) to be recorded.

Thus, applying the optical system of the present invention to the image pickup apparatus such as an interchangeable lens for a single-lens reflex camera, an optical apparatus with high optical performance can be achieved. Similarly, the present invention can also be applied to an SLR (single-lens reflex) camera which does not have a quick return mirror. Similarly, the optical system of the present invention can also be applied to a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-113521, filed on May 17, 2012, which is hereby incorporated by reference herein in its entirety.

What is claimed is:

1. An optical system comprising:
   a magnification conversion optical unit configured to be insertable and removable at a position between an aperture stop and an image plane of the optical system in order to change a focal length of the optical system,
   wherein a total lens length of the optical system is constant before and after insertion of the magnification conversion optical unit,
   wherein the magnification conversion optical unit comprises, in order from an object side to an image side across the widest air gap, a front lens unit having a positive refractive power and a rear lens unit having a negative refractive power, and
   wherein the following conditional expressions are satisfied:

$$0.40 < Le/Lp < 0.75, \text{and}$$

$$0.34 \le fn/fe < 0.6$$

where Lp is a length on an optical axis from the aperture stop to the image plane of the optical system, Le is a length on the optical axis from a lens surface closest to an object side of the magnification conversion optical unit to the image plane when the magnification conversion optical unit is inserted, fn is a focal length of the rear lens unit, and fe is a focal length of the magnification conversion optical unit.

2. The optical system according to claim 1, wherein the rear lens unit includes at least two negative lenses and at least one positive lens.

3. The optical system according to claim 1, further comprising a lens unit having a negative refractive power that moves in a direction having a component in a direction perpendicular to the optical axis so as to move an imaging position in the direction perpendicular to the optical axis at the object side relative to the position where the magnification conversion optical unit is insertable and removable.

4. The optical system according to claim 1, wherein the optical system is a zoom lens, and
   wherein the following conditional expression is satisfied:

$$0.3 < ft/fFt \le 1.0$$

where fFt is a focal length of a front optical system that is disposed at the object side relative to the position where the magnification conversion optical unit is insertable and removable in the optical system at a telephoto end, and ft is a focal length of a total system at the telephoto end.

5. The optical system according to claim 1, wherein the optical system is a zoom lens and comprises, in order from the object side to the image side, a first lens unit having a positive refractive power which does not move in zooming, a second lens unit having a negative refractive power which moves in zooming, a third lens unit having a positive refractive power which moves in zooming, and a fourth lens unit having a positive refractive power which does not move in zooming,
wherein the fourth lens unit comprises, in order from the object side to the image side, a first lens subunit, the aperture stop, a second lens subunit having a negative refractive power that moves in a direction having a component of a direction perpendicular to the optical axis so as to move an imaging position in the direction perpendicular to the optical axis, a third lens subunit, and a fourth lens subunit, and
wherein the magnification conversion optical unit is insertable and removable between the third lens subunit and the fourth lens subunit.

6. The optical system according to claim 1,
wherein the optical system is a fixed focal length lens, and
wherein the following conditional expression is satisfied:

$$0.3 < fa/fFa \leq 1.0$$

where fFa is a focal length of a front optical system that is disposed at the object side relative to the position where the magnification conversion optical unit is insertable and removable in the optical system, and fa is a focal length of a total system of the optical system.

7. The optical system according to claim 1, wherein the optical system comprises, in order from the object side to the image side, a first lens unit having a positive refractive power, the aperture stop, a second lens unit, a third lens unit having a negative refractive power that moves in a direction having a component of a direction perpendicular to the optical axis so as to move an imaging position in the direction perpendicular to the optical axis, and a fourth lens unit, and
wherein the magnification conversion optical unit is insertable and removable at a position between the third lens unit and the fourth lens unit.

8. The optical system according to claim 1, wherein the optical system is configured to form an image on a solid-state image pickup element.

9. An image pickup apparatus comprising:
an optical system; and
a solid-state image pickup element configured to receive light of an image formed by the optical system,
wherein the optical system comprises a magnification conversion optical unit configured to be insertable and removable at a position between an aperture stop and an image plane of the optical system in order to change a focal length of the optical system,
wherein a total lens length of the optical system is constant before and after insertion of the magnification conversion optical unit,
wherein the magnification conversion optical unit comprises, in order from an object side to an image side across the widest air gap, a front lens unit having a positive refractive power and a rear lens unit having a negative refractive power, and
wherein the following conditional expressions are satisfied:

$$0.40 < Le/Lp < 0.75, \text{ and}$$

$$0.34 \leq fn/fe < 0.6$$

where Lp is a length on an optical axis from the aperture stop to the image plane of the optical system, Le is a length on the optical axis from a lens surface closest to an object side of the magnification conversion optical unit to the image plane when the magnification conversion optical unit is inserted, fn is a focal length of the rear lens unit, and fe is a focal length of the magnification conversion optical unit.

10. An optical system comprising:
a magnification conversion optical unit configured to be insertable and removable at a position between an aperture stop and an image plane of the optical system in order to change a focal length of the optical system,
wherein a total lens length of the optical system is constant before and after insertion of the magnification conversion optical unit,
wherein the magnification conversion optical unit comprises, in order from an object side to an image side across the widest air gap, a front lens unit having a positive refractive power and a rear lens unit having a negative refractive power,
wherein the rear lens unit includes at least two negative lenses and at least one positive lens, and
wherein the following conditional expression is satisfied:

$$0.40 < Le/Lp < 0.75$$

where Lp is a length on an optical axis from the aperture stop to the image plane of the optical system, and Le is a length on the optical axis from a lens surface closest to an object side of the magnification conversion optical unit to the image plane when the magnification conversion optical unit is inserted.

11. A zoom lens comprising:
in order from an object side to an image side, a first lens unit having a positive refractive power which does not move in zooming, a second lens unit having a negative refractive power which moves in zooming, a third lens unit having a positive refractive power which moves in zooming, and a fourth lens unit having a positive refractive power which does not move in zooming,
wherein the fourth lens unit comprises, in order from the object side to the image side, a first lens subunit, an aperture stop, a second lens subunit having a negative refractive power that moves in a direction having a component of a direction perpendicular to an optical axis so as to move an imaging position in the direction perpendicular to the optical axis, a third lens subunit, and a fourth lens subunit,
wherein a magnification conversion optical unit is configured to be insertable and removable at a position between the third lens subunit and the fourth lens subunit in order to change a focal length of the zoom lens,
wherein a total lens length of the zoom lens is constant before and after insertion of the magnification conversion optical unit, and
wherein the following conditional expression is satisfied:

$$0.40 < Le/Lp < 0.75$$

where Lp is a length on an optical axis from the aperture stop to an image plane of the zoom lens, and Le is a length on the optical axis from a lens surface closest to an object side of the magnification conversion optical unit to the image plane when the magnification conversion optical unit is inserted.

12. A fixed focal length lens comprising:
a magnification conversion optical unit configured to be insertable and removable at a position between an aperture stop and an image plane of the fixed focal length lens in order to change a focal length of the fixed focal length lens,
wherein a total lens length of the fixed focal length lens is constant before and after insertion of the magnification conversion optical unit, and
wherein the following conditional expressions are satisfied:

$$0.40 < Le/Lp < 0.75, \text{ and}$$

$$0.3 \leq fa/fFa \leq 1.0$$

where Lp is a length on an optical axis from the aperture stop to the image plane of the fixed focal length lens, Le is a length on the optical axis from a lens surface closest to an object side of the magnification conversion optical unit to the image plane when the magnification conversion optical unit is inserted, fFa is a focal length of a front optical system that is disposed at the object side relative to the position where the magnification conversion optical unit is insertable and removable in the fixed focal length lens, and fa is a focal length of a total system of the fixed focal length lens.

* * * * *